2,890,227

16-METHYLENE-TESTOSTERONE, ITS ESTERS AND INTERMEDIATES AND PROCESS FOR PREPARING THE SAME

Octavio Mancera and George Rosenkranz, Mexico City, Mexico, and Franz Sondheimer, Rehovoth, Israel, assignors to Syntex S.A., Mexico City, Mexico, a corporation of Mexico No Drawing. Application May 11, 1956
Serial No. 584,176

Claims priority, application Mexico May 12, 1955

10 Claims. (Cl. 260—397.3)

The present invention relates to novel cyclopentanophenanthrene derivatives and to a process for the preparation thereof. More particularly, the present invention relates to the novel androgenic hormones 16-methylene-$\Delta^4$-androsten-17$\beta$-ol-3-one (16-methylene-testosterone) and its esters, to certain novel intermediates for the production thereof and to a novel process for the preparation of 16-methylene-testosterone involving these novel intermediates.

In accordance with the present invention it has been discovered that 16-methylene-testosterone may be prepared from the known 16-dimethylaminomethyl-$\Delta^5$-androsten-3$\beta$-ol-17-one, and that the novel compounds 16-methylene-testosterone and its esters are valuable hormones with anabolic androgenic properties.

The following equation illustrates the process of the present invention and the production of the novel 16-methylene-$\Delta^4$-androsten-17$\beta$-ol-3-one as well as the production of the novel intermediates 16-methylene-$\Delta^5$-androsten-3$\beta$-ol-17-one, 16-methylene-$\Delta^4$-androsten-3,17-dione and 16-methylene-$\Delta^4$-3,17$\beta$-diol:

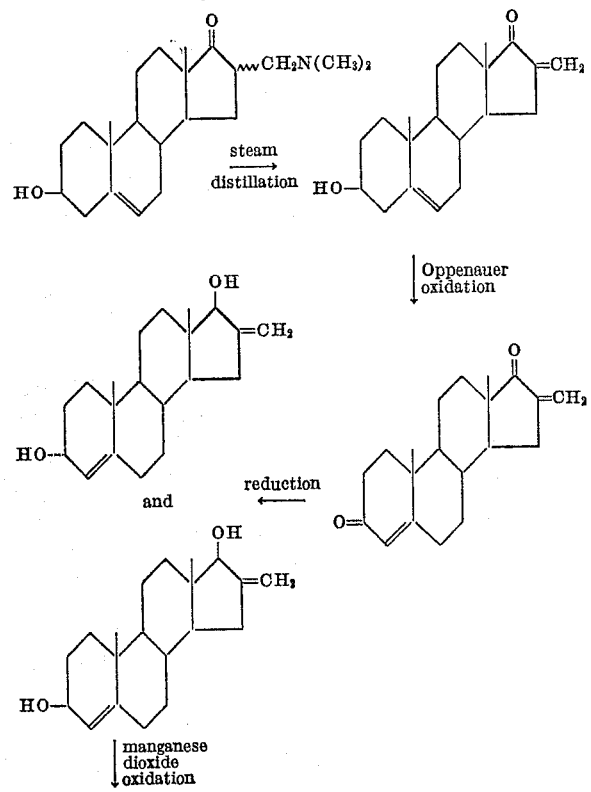

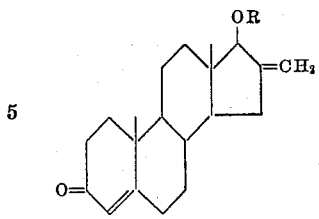

In the above equation R may represent hydrogen in the case of the free compound or an ester group, i.e. the esterification residue of an organic acid conventionally utilized for the esterification of steroid alcohols; especially the residue of a hydrocarbon carboxylic acid of less than about 10 carbon atoms such as acetic, propionic, butyric, cyclopentyl proprionic, benzoic etc.

For the first step of the process as outlined in the above equation the known 16-dimethylaminomethyl-$\Delta^5$-androsten-3$\beta$-ol-17-one was steam distilled in water until the distillate no longer had an alkaline reaction. Upon cooling and precipitation there is prepared 16-methylene-$\Delta^5$-androsten-3$\beta$-ol-17-one.

For the second step the 16-methylene-$\Delta^5$-androsten-3$\beta$-ol-17-one is dissolved in an inert solvent as for example toluene and oxidized with an aluminum alkanoate in the presence of a ketone hydrogen acceptor, preferably aluminum isopropylate in the presence of cyclohexanone. The reaction mixture is refluxed for a short period of time, as for example thirty minutes, upon purification there is produced 16-methylene-$\Delta^4$-androsten-3,17-dione. This last mentioned compound is then reduced with a reducing agent, preferably sodium borohydride, to prepare a mixture of the corresponding 3$\alpha$ and 3$\beta$-hydroxy compounds which may in general be referred to as 16-methylene-$\Delta^4$-androsten-3,17$\beta$-dial.

For the last step of the process, the mixture of 3$\alpha$ and 3$\beta$-diols is oxidized with manganese dioxide for a substantial period of time at room temperature to preferentially oxidize the 3-alcohol group and to prepare the corresponding 3-ketone namely 16-methylene-testosterone. The corresponding 17-esters may then be prepared by conventional esterification methods, i.e. by reaction with the appropriate acid anhydride in pyridine or by the equally conventional use of acyl halides.

The following specific examples serve to illustrate but are not intended to limit the present invention:

Example I

A suspension of 25 g. of 16-dimethylaminomethyl-$\Delta^5$-androsten-3$\beta$-ol-17-one in 1 liter of water was steam distilled until the distillate no longer had an alkaline reaction. The suspension was cooled in ice and the crystalline precipitate was filtered, thus giving 20.2 g. of 16-methylene-$\Delta^5$-androsten-3$\beta$-ol-17-one with a melting point of 174°–178° C. Crystallization from acetone gave the analytical sample having a melting point of 183°–184° C., [$\alpha$]$_D$—56° (chloroform).

Example II 42.4 g. of 16-methylene-$\Delta^5$-androsten-3$\beta$-ol-17-one was dissolved in a mixture of 1500 cc. of toluene and 150 cc. of cyclohexanone and approximately 100 cc. of the mixture was distilled in order to remove traces of moisture. A solution of 40 g. of aluminum isopropylate in 200 cc. of toluene was then added in the course of ten minutes and the mixture was refluxed under anhydrous conditions for thirty minutes. The mixture was steam distilled, the residue was extracted with ethyl acetate and the organic layer was washed with water, dried and evaporated to dryness. The amorphous residue was chromatographed in a column with 2 kg. of neutral alumina. The fractions eluted from the column with benzene were crystallized from acetone-ether, thus yielding 7.78 g. of 16-methylene-$\Delta^4$-androstene-3,17-dione with a melting point of 159°–161° C., $[\alpha]_D+110°$ (chloroform).

*Example III*

5.14 g. of 16-methylene-$\Delta^4$-androstene-3,17-dione was dissolved in 600 cc. of methanol and the solution was cooled in ice and mixed with a solution of 5 g. of sodium borohydride in 15 cc. of water. The mixture was kept for 16 hours at room temperature, the excess of reagent was decomposed by the addition of acetic acid, the solution was concentrated to a small volume under reduced pressure and diluted with water. The product was extracted with ethyl acetate and the organic layer was washed with water, dried and evaporated. The solid residue was stirred for 8 hours at a temperature of 20° C. with 500 cc. of chloroform and 50 g. of manganese dioxide. The dioxide was filtered and washed with hot chloroform and the combined filtrate was evaporated. The residue was chromatographed in a column with 250 g. of neutral alumina and the fractions eluted from the column with benzene-ether crystallized from acetone to give 2.02 g. of 16-methylene-testosterone with a melting point of 187°–188° C., $[\alpha]_D-15°$.

By routine methods (heating with acetic anhydride in pyridine) and crystallization from acetone-hexane there was obtained the acetate of 16-methylene-testosterone with a melting point of 148°–150° C., $[\alpha]_D-4°$ (chloroform).

Other 17-esters of 16-methylene testosterone are prepared by reacting the free steroid with acid anhydrides according to the above-described acylation procedure or by conventionally utilizing the corresponding acyl halides. These esters include esters of hydrocarbon carboxylic acids of less than 10 carbon atoms derived from saturated or unsaturated, aliphatic, carbocyclic, or cycloaliphatic, aryl, arylalkyl, alkaryl, mono, di or polycarboxylic acids which form ester groups such as for example formyloxy, propionoxy, dimethyl-acetoxy, trimethylacetoxy, butyryloxy, valeryloxy, benzoxy, phenylacetoxy, toluoyloxy, cyclopentylformoxy, acryloxy and the esters of dicarboxylic acids such as succinic, glutaric and adipic.

We claim:

1. A process for the preparation of 16-methylene-testosterone comprising subjecting 16-dimethylamino-methyl-$\Delta^5$-androsten-3$\beta$-ol-17-one to steam distillation to prepare 16-methylene-$\Delta^5$-androsten-3$\beta$-ol-17-one, oxidizing 16-methylene-$\Delta^5$-androsten-3$\beta$-ol-17-one with an aluminum alkanoate in the presence of a hydrogen acceptor to prepare 16-methylene-$\Delta^4$-androsten-3,17-dione, reducing the dione thus formed with sodium borohydride to form 16-methylene-$\Delta^4$-androsten-3,17$\beta$-diol and selectively oxidizing the diol thus formed with manganese dioxide.

2. The process of claim 1 wherein the aluminum alkanoate is aluminum isopropylate and the hydrogen acceptor is cyclohexanone.

3. A method for the preparation of 16-methylene-$\Delta^4$-androsten-3,17-dione which comprises oxidizing 16-methylene-$\Delta^4$-androsten-3$\beta$-ol-17-one with aluminum alkanoate in the presence of a hydrogen acceptor.

4. The process of claim 3 wherein the aluminum alkanoate is aluminum isopropylate and the hydrogen acceptor is cyclohexanone.

5. A process for the preparation of 16-methylene-testosterone which comprises reducing 16-methylene-$\Delta^4$-androsten-3,17-dione with sodium borohydride to form the corresponding mixture of isomeric C-3 diols and selectively oxidizing the 3-hydroxy group of the diols with manganese dioxide.

6. 16-methylene-$\Delta^4$-androstene-3,17-dione.

7. 16-methylene-$\Delta^4$-androsten-3,17$\beta$-diol.

8. A new compound selected from the group consisting of 16-methylene-testosterone and hydrocarbon carboxylic esters thereof of less than 10 carbon atoms.

9. 16-methylene-testosterone.

10. The acetate of 16-methylene-testosterone.

References Cited in the file of this patent

UNITED STATES PATENTS 2,588,391    Julian _____ Mar. 11, 1952